March 28, 1944. J. B. VAN DER WERFF 2,345,306
FLUID CONTROLLED VALVE
Filed Feb. 24, 1942
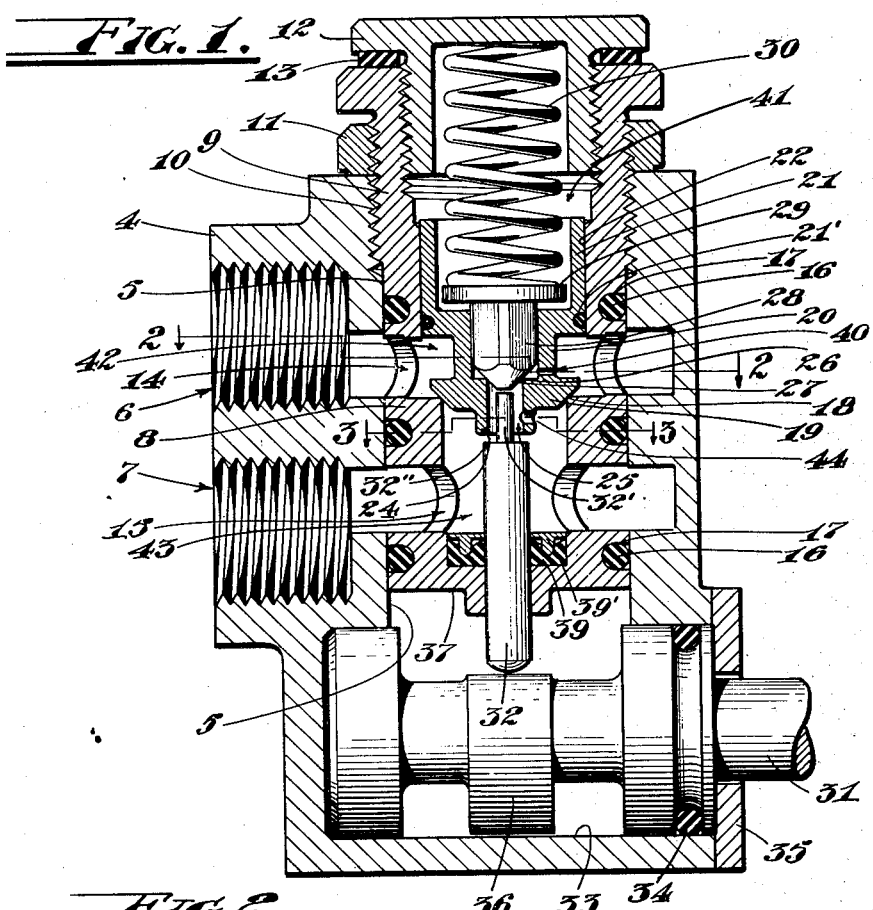
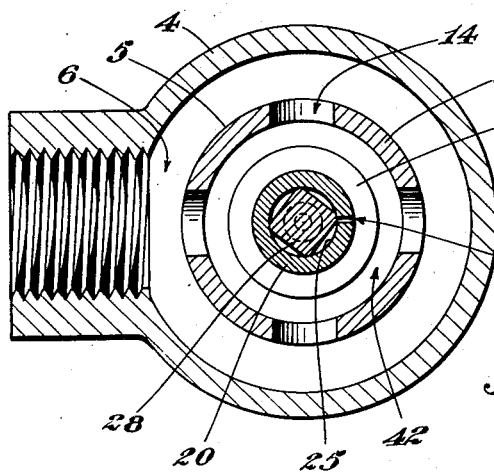
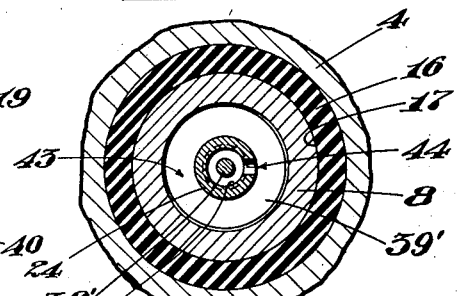
Inventor
Jacob B. Van Der Werff
By R. S. Birch
Attorney Patented Mar. 28, 1944

2,345,306

UNITED STATES PATENT OFFICE 2,345,306

FLUID CONTROLLED VALVE

Jacob B. Van Der Werff, Pasadena, Calif., assignor to Adel Precision Products Corp., a corporation of California Application February 24, 1942, Serial No. 432,148

6 Claims. (Cl. 137—139)

This invention relates to improvements in control valves for hydraulically actuated equipment of aircraft.

The primary object of my invention is to provide an improved fluid controlled valve which will reduce the control valve handle load and the operating load, also the equipment and installation loads in a hydraulic system for aircraft, to such extent that higher operating pressures may be efficiently used with a consequent advantageous reduction in the size and weight of the component elements of the system.

Another object of my invention is to provide a valve of the character described which includes a main valve and a smaller pilot valve wherein the lifting or opening force for the main valve is effected by the operating fluid when the pilot valve, which opens responsive to a small externally derived force (manual or from an electrical or other prime mover), is lifted from its seat by means of associated valve operating means. This arrangement makes it possible to readily and easily open the main valve at will with but a small force under all flow conditions of the operating fluid even though the valve is pressure seated in a system employing extremely high operating pressures. In addition, this valve construction and arrangement makes it possible to use light weight valve operating means whether said means is manually operated or operated with an electrical or other prime mover, in which latter case the prime mover could be of light weight and lower power.

A further object of my invention is to provide a fluid pressure controlled valve unit of the character described in which the fluid will cushion the closing of the main valve so as to prevent severe hydraulic shock loads sometimes occasioned in pressure seated valves.

Another object of my invention is to provide a valve of the character described in which wear compensating adjustment and adjustments as to the timing of the valves may be readily and easily effected by simply axially adjusting the valve cage in the valve body.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a vertical sectional view of a valve unit embodying my invention;

Fig. 2 is a sectional view taken on the line 2—2 of Fig. 1;

Fig. 3 is a fragmentary sectional view taken on the line 3—3 of Fig. 1.

Referring to the drawing more specifically, one embodiment of my invention includes a valve body 4 having a valve receiving bore 5, a pressure fluid intake port 6 and an outlet port 7, which ports open into the bore at axially spaced points.

A tubular valve cage 8 is axially adjustably mounted in the bore 5 and has a screw threaded outer end 9 cooperating with screw threads 10 in the outer end of said bore, the cage otherwise having a close fit with the bore. A lock nut 11 holds the cage in the desired position of adjustment. A flanged externally threaded cap 12 closes the outer end of the cage, there being a sealing ring 13 between the flange of the cap and the outer end of the cage.

At axially spaced points between the ends of the cage are intake and outlet ports 14 and 15 respectively registering with the intake and outlet ports 6 and 7 of the body.

Sealing rings 16 of circular cross section are carried by the cage in grooves 17 therein and engage the wall of the bore 5 adjacent and on opposite sides of the points where the ports of the body and cage register.

Between the ports 14 and 15 the cage is provided with an internal annular valve seat 18 for a circular disk-like main valve 19 which controls the flow of fluid between the ports 14 and 15 in the cage.

A valve stem 20 of considerably less diameter than the valve 19 is extended outwardly therefrom and jointed to an enlarged extension forming a hollow piston 21 having a working fit in a cylinder portion 22 of the valve cage. Suitable sealing ring 21' is provided in the piston. In this connection it is noted that the diameter of the piston 21 is greater than that of the valve seat for a purpose to be hereinafter described.

Extending through the center of the piston 21, valve stem 20, main valve 19 and a tubular inward extension 24 on said valve, is a passage 25 opening into the cage below the valve and into the space above the piston. Between the ends of the passage 25 is an annular seat 26 for a frustro-conical pilot valve 27, having a stem 28 slidably engaged in said passage and formed with an angular cross section to permit free flow of fluid past it in the passage 25. On its outer end the stem 28 is provided with a flanged spring retaining disk 29 for a spring 30 which abuts the cap 12 and exerts a seating force on the pilot valve and also on the main valve when the pilot valve is seated.

Valve operating means including a cam shaft 31 and a push rod 32 are provided for initially opening the pilot and completing the opening action of the main valve. As here shown the cam shaft 31 is mounted to rotate in a bore 33 which intersects the inner end of the bore 5 in the body 4, said cam shaft bore being sealed by means of a sealing ring 34 and held in place by means of a plate 35. A cam 36 on the shaft 31 operates the push rod 32 which latter has a sealed and sliding fit in the closed end 37 of the valve cage. An expansible sealing ring 39 and a metal crowding ring 39' surrounds the push rod so that the operating pressure will cause the crowding ring to expand the expansible ring and provide an effective seal.

The outer end 32' of the push rod is reduced to define an annular shoulder 32" near said end. The reduced end 32' extends into the passage 25 for contacting the pilot valve 27 whereas the shoulder 32" is disposed for contacting the inner end of the extension 24 on the main valve 19.

In order to provide for seating of the main valve by the pressure of operating fluid when the pilot valve is closed, yet permit operating fluid to lift the main valve when the pilot valve is opened, there is provided a small bleed or bypass port 40 which allows operating fluid between the valve 19 and the piston 21 to pass into the passage 25 above the point where the pilot valve is seated therein. Fluid thus introduced into the passage 25 will flow past the stem 28 through the piston 21 and into an auxiliary chamber 41 formed in the outer end of the cage between said piston and the cap 12. It is obvious at this point that the bleed or bypass port 40 could extend through the piston to directly communicate with the spaces on opposite sides of the piston instead of opening into passage 25. The annular space in the cage between the valve 19 and exterior of the piston 21, into which space the intake port 14 opens, constitutes the main pressure chamber 42. Pressure fluid entering the chamber 41 from the bleed port 40 will produce a fluid pressure in chamber 41 equal or substantially equal to that in the chamber 42, whereupon the effective pressure in the two chambers causes the valve 19 to be seated.

It is now seen that when the pressure fluid beyond the piston in the auxiliary chamber 41 is substantially equal to that of the fluid in the main pressure chamber 42 in which the valve 19 and its seat are located, the valve will be pressure seated. However, when the pilot valve 27 is opened and the pressure in the auxiliary chamber 41 is reduced below that in the main pressure chamber 42, the piston will be moved outwardly to unseat the main valve.

Upon operating the cam shaft 31 for opening the pilot valve 27, the end 32' of the push rod 32 engages and unseats the pilot valve before the shoulder 32" engages the extension 24 and unseats the main valve 19. Upon this unseating of the pilot valve, pressure fluid will escape from the auxiliary chamber 41 through the seat 26 and passage 25 into the low pressure or outlet chamber 43 at a rate faster than the rate of flow of pressure fluid into chamber 41 through the small port 40, due to the differential areas of these flow channels, thereby reducing the pressure in chamber 41 below that in chamber 42. When this pressure reduction takes place, the piston 21 will be moved by the fluid pressure in chamber 42 to lift the main valve from its seat. The purpose of the shoulder 32" is to continue the opening movement of the main valve, after the pressure effected opening thereof, by direct contact with the valve extension 24, and this prevents the valve from reaching an equilibrium position under fluid actuation somewhat below or less than the open position desired.

Provision is made for discharge of the fluid from the passage 25 through a side port 44 when the shoulder 32" engages the lower end of the tubular valve extension 24 and otherwise closes the passage 25 therein.

After the main valve 19 is unseated by means of the pressure fluid, the pressure of the fluid in the auxiliary chamber 41 is restored by the flow of fluid thereto through passage 25 and port 40 so that it substantially equals the pressure in chamber 42 with the result that the main valve becomes balanced. This takes place in consideration of the continued lifting movement of the push rod 32 past the point at which the pilot valve is initially opened sufficiently to cause the bleeding of the main valve seating pressure fluid from auxiliary chamber 41. The continued lifting movement of course moves the shoulder so that the valve is mechanically lifted into fully opened position following its initial fluid-effected lifting movement. As the valve 19 is balanced immediately following the unseating thereof by the fluid, the continued mechanical lifting may be effected with little or no force due to the equilibrium condition thus attained.

It is seen that when the shoulder 32" is engaged with the extension 24 of the valve 19, the pilot valve 29 will be held open by the reduced end 32' of the push rod 32 and therefore as long as the mechanical lifting means for the valve is held in a predetermined valve opening position the pilot valve and main valve will be held open.

It should be noted that when the cam shaft 31 is actuated to release the pilot and main valves, the spring 30 effects the closing of the pilot valve before the main valve closes because of the restricted displacement flow from the chamber 42 into chamber 41. However, when the pilot valve is seated the spring tends to seat the main valve but this valve can then only be seated at a rate determined by the rate of displacement of fluid from the main pressure chamber 42 through the small bleed port 40 into chamber 41 and consequently a hydraulic cushioning action is provided to eliminate severe hydraulic shock loads on the main valve in closing.

Attention is called to the fact that the particular valve cage and valve arrangement hereof affords wear compensating adjustments of the valve ports and regulation of the valve action by means of axially adjusting the cage in the valve receiving bore 5. The threaded connection of the cage with the valve body and the lock nut on the cage make it possible to readily and easily effect the desired adjustment of the cage and valve ports for the purpose above mentioned.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a fluid controlled valve, a valve body having a bore therein and provided with fluid intake and outlet ports leading into said bore at axially spaced points, a tubular valve cage mounted in said bore and having an open outer end and a closed inner end and axially spaced intake and outlet openings intermediate its ends registering with said intake and outlet ports, sealing means to prevent leakage between said bore and said cage, a cap closing the open end of said cage, a valve seat in said cage between said intake and outlet openings, a fluid pressure seated main valve for cooperating with said seat, a cylinder portion in said cage, a piston reciprocable in said cylinder portion, a tubular stem connecting said piston with said valve so as to define between the valve and the piston a main pressure chamber at all times open to said fluid intake opening, there being an auxiliary chamber between the piston and the cap, a passage extending through the piston and valve for affording communication independent of said main chamber, between said auxiliary chamber and said outlet opening when the main valve is closed, a pilot valve controlling said passage, a spring operative to seat said pilot valve and being ineffective to urge the main valve toward its seat when the pilot valve is opened, a bleed port in the piston and valve assembly affording the passage of pressure fluid from the main pressure chamber to the auxiliary chamber when the pilot valve and the main valve are closed, and means initially operable for opening the pilot valve and thereafter operable to open the main valve.

2. In a fluid controlled valve, a valve body having a main chamber for intaking operating fluid under pressure, an auxiliary chamber and a fluid outlet chamber, a pressure seated main valve for controlling the flow of operating fluid from the main chamber into the outlet chamber, fluid responsive means which, when the fluid pressures in said main and auxiliary chambers are substantially equal, causes the effective pressures to seat the main valve, said fluid responsive means operating when the pressure in the auxiliary chamber is reduced below that in the main chamber, to unseat the main valve, a passage affording communication between the auxiliary chamber and the fluid outlet chamber when said main valve is closed, a pilot valve for controlling the flow of fluid through said passage, a bleed port affording communication between said main and auxiliary chambers when the main valve and the pilot valve are closed, to substantially equalize the fluid pressures in the main and auxiliary chambers, valve operating means initially operable to open the pilot valve and then lift the unseated main valve and maintain said valves in open position and also movable to release said valves; a spring operating against the pilot valve for urging it toward its seat, said bleed port being of such small diameter as to restrict the flow of fluid therethrough into the auxiliary chamber to a rate less than the rate of outflow of fluid from the auxiliary chamber when the pilot valve is opened; and a tubular valve cage mounted in said body and having a main valve seat between its ends and completely housing said fluid responsive means, said valves and said passage; said cage together with said valve seat and fluid responsive means defining the said main, auxiliary and outlet chambers.

3. In a fluid controlled valve, a valve body having a main chamber for intaking operating fluid under pressure, an auxiliary chamber and a fluid outlet chamber, a pressure seated main valve for controlling the flow of operating fluid from the main chamber into the outlet chamber, fluid responsive means, which, when the fluid pressures in said main and auxiliary chambers are substantially equal, causes the effective pressures to seat the main valve, said fluid responsive means operating when the pressure in the auxiliary chamber is reduced below that in the main chamber to unseat the main valve, a passage affording communication between the auxiliary chamber and the fluid outlet chamber when said main valve is closed, a pilot valve for controlling the flow of fluid through said passage, a bleed port affording communication between said main and auxiliary chambers when the main valve and the pilot valve are closed, to substantially equalize the fluid pressures in the main and auxiliary chambers, valve operating means initially operable to open the pilot valve and then lift the unseated main valve and maintain said valves in open position and also movable to release said valves; a spring operating against the pilot valve for urging it toward its seat, said bleed port being of such small diameter as to restrict the flow of fluid therethrough into the auxiliary chamber to a rate less than the rate of outflow of fluid from the auxiliary chamber when the pilot valve is opened; a tubular valve cage mounted in said body for axial adjustment therein and having a main valve seat between its ends and housing said fluid responsive means, said cage together with said valve seat and fluid responsive means defining the said main, auxiliary and outlet chambers; and means providing for axial adjustment of said cage in said body to change the relative positions of the main and pilot valves and said valve operating means for regulating the operation of said valves.

4. In a hydraulic valve, a valve body having a bore therein and fluid intake and outlet ports opening at axially spaced points into said bore, a tubular cage axially adjustably mounted in said bore and having its inner end closed, a cap closing the outer end of said cage, sealing rings carried by and movable with the cage upon axial adjustment thereof, said cage having intake and outlet openings between its ends registering with said intake and outlet ports respectively, valvular means in said cage operative to control the flow of fluid through the cage and being movable in entirety therewith upon axial adjustment of the cage, said valvular means including relatively movable valves, a push rod means for actuating said valves slidable freely through the closed inner end of the cage and extended into said bore, means in said bore for moving said push rod means into and out of operative contact with said valves, and means providing for axially adjusting said cage relative to said body to vary the position of the valves relative to said push rod means for regulating the action of said valvular means.

5. In a hydraulic valve, a valve body having a bore therein, a tubular cage axially adjustably mounted in said bore and having fluid intake and outlet openings and a closed inner end, valvular means carried by said cage to control the flow of fluid therethrough and being movable in entirety therewith upon axial adjustment of the cage, said valvular means including relatively movable valves, push rod means detached from and movable relative to said valves and freely through the closed inner end of the cage, a sealing means around said push rod means within said cage and against said inner closed end; means in said bore for moving said push rod means into and out of operative contact with said valves, said cage having circumferential grooves therein, sealing rings carried in said grooves and operative to prevent leakage between said bore and said cage and means providing for axial adjustment of said cage relative to said bore to vary the position of the valves relative to said push rod means for regulating the operation of said valves.

6. In a hydraulic valve, a valve body having a bore therein and provided at points axially spaced apart between the ends of said bore with fluid intake and outlet ports extending circumferentially therein, a tubular valve cage mounted in said bore and provided between its ends with a plurality of radial intake openings and a plurality of radial outlet openings registering with and at all times opening into the intake and outlet ports respectively, an end wall closing the inner end of said tubular cage, closure means in the outer end of said cage, sealing means carried by the cage and circumferentially engaging the wall of the bore in the valve body on opposite sides of said ports, an annular valve seat in said cage between the intake openings and the outlet openings therein, a main valve seated on said seat and having one side at all times directly exposed to the pressure of the fluid passing through said radial intake openings, a tubular stem extending from said side of said valve toward said outer end of said bore and terminating at a point beyond said radial intake openings, a piston on the outer end of said stem having a working fit in said cage and provided with an axial opening registering with the bore of said stem, a spring interposed between said closure means and said piston to urge said valve against its seat; said piston, cage, valve and stem defining an annular pressure chamber in said cage between said side of said valve and said piston, with said chamber at all times afforded direct communication through said intake openings with said circumferential intake port; said cage, closure means and piston defining an auxiliary chamber between the piston and said closure means, a port affording communication through the piston of the annular chamber with said auxiliary chamber; said end wall, cage and valve defining an outlet chamber in said cage, said valve having a passage extending axially therethrough affording communication through the bore of said stem of said outlet chamber and said auxiliary chamber, valvular means for controlling the flow of fluid through said passage, and means for operating said valvular means.

JACOB B. VAN DER WERFF.